Patented June 19, 1951

2,557,136

UNITED STATES PATENT OFFICE 2,557,136

ESTERS OF α,β-UNSATURATED DICARBOXYLIC ACIDS WITH CYCLIC ADDUCTS OF CONJUGATED DIENES AND β,γ-UNSATURATED ALCOHOLS

Joseph Nichols, New York, N. Y., assignor to Interchemical Corporation, New York, N. Y., a corporation of Ohio No Drawing. Application March 6, 1948, Serial No. 13,529

12 Claims. (Cl. 260—78.4)

This invention relates to a novel class of resinous products which may be obtained by esterifying or co-esterifying an α,β-unsaturated dicarboxylic acid or the anhydride thereof with the adduct of a conjugated diene, such as butadiene, isoprene, or cyclopentadiene and a β,γ-unsaturated alcohol, such as allyl alcohol, methallyl alcohol, or crotyl alcohol.

A new type of ester has been found which is easily polymerizable into excellent thermosetting resins. These esters may initially be obtained either as condensation products already polymerized to a certain degree, or as low viscosity, light colored oils which, however, may also be bodied to any desired viscosity. In some cases, the material, having been only partly polymerized during the condensation, will yield a high melting, crystalline monomer precipitate on standing. The resins have been found compatible with most commercial alkyds, lacquers and varnishes and valuable compositions may be made therefrom, having improved properties of adhesion, film toughness, and hardness as well as high resistance toward influences of the atmosphere, and of acids and alkalies. Since, furthermore, the esterification may be conducted in the presence of divers modifiers, the herein claimed invention furnishes the base for a great variety of new compounds.

Some adducts have been utilized before in the preparation of ester resins. Thus, the maleic acid-cyclopentadiene adduct (carbic anhydride) has been condensed with saturated or unsaturated mono or polyhydric alcohols, with or without drying oil fatty acids, or carbic anhydride has been co-esterified with polyhydric alcohols and acidic natural resins. Resin compositions of this type, however, are entirely dissimilar from the here claimed condensation products, in that they have, generally, poor thermosetting properties. Although diallyl carbate, for instance, may be polymerized by using a peroxide catalyst or by blowing with air while heating, it does not show any appreciable increase in viscosity after being heated under carbon dioxide for, say, eight hours at 200° C.

While I found the adducts between conjugated dienes and β,γ-unsaturated alcohols, after esterification with most saturated and unsaturated mono- or dicarboxylic acids, to give valuable products for different uses, such as the ester from the cyclopentadiene-allyl alcohol adduct with sebacic acid, which, for instance, provides an excellent plasticizer for vinyl polymers, compounds of this type proved to be non-curing similar to the esters made from carbic anhydride. Therefore it was entirely unexpected that heat curable, thermosetting resins rather than thermoplastic materials would result from the esterification of the said adducts with α,β-unsaturated dicarboxylic acids. The surprising fact that thermosetting resins result from a reaction of this type must be attributed in the first place, to the activity of the isolated double bond contained in the molecule of the adducts, since I found that hydrogenation of these adducts, with platinum oxide at room temperature, for instance, whereby the double bond is eliminated, destroys all thermosetting properties. Secondly, it must be attributed to the specific unsaturation of α,β-unsaturated dicarboxylic acids, since esterification with other types of acids produces non-thermosetting materials. It seems that in this instance the double bonds of the reactants mutually activate each other and that thereby an inordinate opportunity for linkages arises, as illustrated by the following probable structure of an intermediary stage of polymerization of the maleic ester of the allyl alcohol cyclopentadiene condensate.

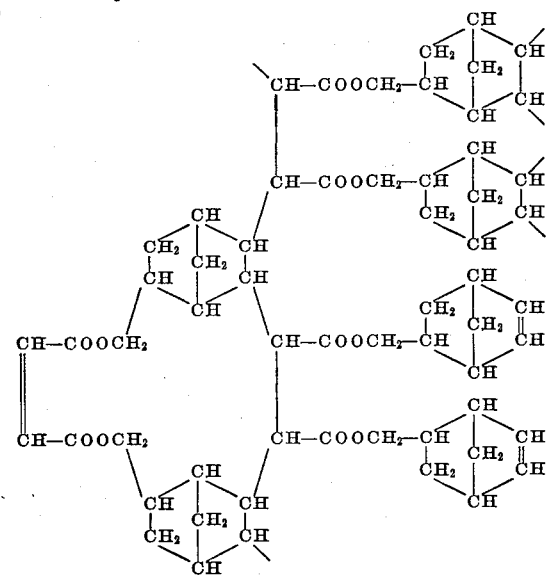

Since these new esters differ considerably in their individual properties, especially as to viscosity and susceptibility to polymerization, they provide a great variety of products for divers uses. Thus, while the maleic ester of 2,5-endomethylene Δ³ tetrahydrobenzyl alcohol ordinarily yields a partly polymerized product, having a viscosity of about 30 poises, the corresponding fumaric ester results predominantly in the monomeric product and is preferably bodied to a higher viscosity than the maleic compound, because the monomeric fumaric ester is a high melting solid, which crystallizes from the reaction composition if present in too high a concentration. Similar esters, such as prepared from the butadiene- or isoprene-allyl alcohol adduct, are usually obtained as low viscosity oils (below 10 poises), after the esterification has been completed, but may be bodied thereafter to any desired viscosity.

Apparently, the methylene bridge in the allyl alcohol-cyclopentadiene molecule creates a strain in the ring system which increases the reactivity of the double bond and the absence of such a methylene bridge in similar adducts from other conjugated dienes accounts for the somewhat lower rate of polymerization of their esterification products with $\alpha,\beta$-unsaturated dicarboxylic acids.

The temperature at which the esterification is carried out must be carefully regulated and is preferably held between about 180 to 190° C. since heating to 200° C. and above will impair the color of the final product. The esterification products are light-yellow oils which cure to hard, brittle films. Continuous heating causes eventual gelation. The polymerization may be catalyzed by peroxide, such as tertiary butyl perbenzoate. Using three per cent of this catalyst, the maleic ester of the allyl alcohol-cyclopentadiene adduct, for example, cast-polymerizes at a temperature of 110–150° C.

I obtain the best results by conducting the reaction in the presence of an excess of the unsaturated alcohol-diene condensation product and by recovering the excess by means of vacuum or steam distillation after the esterification has been completed.

Films of these resins, such as of the maleic or fumaric ester of an allyl alcohol-cyclopentadiene condensate, when coated on glass or tin panels, cure completely within 10 to 20 minutes at 325° F., while similar esters made with adducts of isoprene, butadiene, or methyl pentadiene with allyl and similar alcohols require a somewhat longer baking time to attain an equal resistance.

The Sward hardness, for example, of the allyl alcohol-cyclopentadiene maleate is 60.

The rates of bodying, by heating and agitating the resins under carbon dioxide at 200° C. are as follows:

|  | hours of bodying | | | | | |
|---|---|---|---|---|---|---|
|  | 0 | 1 | 2 | 3 | 4 | 5 |
|  | poises | | | | | |
| allyl alcohol-isoprene maleate | 8.8 | 13 | 30 | 55 | 90 | 150 |
| allyl alcohol-butadiene maleate | 3.7 | 8 | 27 | 46 | 70 | 120 |
| allyl alcohol-butadiene fumarate | 5.5 | 15 | 35 | 70 | 125 |  |
| allyl alcohol cyclopentadiene maleate | 27 | 50 | 75 | 140 |  |  |
| allyl alcohol cyclopentadiene fumarate | 28 | 70 | 160 |  |  |  |
| allyl alcohol-methyl pentadiene maleate | 15 | 24 | 38 | 54 | 72 | 96 |
| allyl alcohol-methyl pentadiene fumarate | 54 | 80 | 128 | 158 | 200 |  |
| crotyl alcohol cyclopentadiene maleate | 25 | 40 | 60 | 95 | 135 |  |
| crotyl alcohol cyclopentadiene fumarate | 35 | 50 | 64 | 123 | 180 |  |

These esters are found to be almost universally compatible with commercial resins. They are compatible with nitrocellulose, ethylcellulose, copolymers of vinyl chloride and vinyl acetate, modified alkyds, varnishes, other cyclopentadiene resins, melamine formaldehyde resin in 1:1 butanol-xylene solution, linseed oil, etc. and they are soluble in most of the common solvents, except glycol, diethylene glycol, and water.

These unsaturated alcohol-conjugated diene adducts may advantageously be co-esterified with $\alpha,\beta$-unsaturated dicarboxylic acids in the presence of other suitable co-reactants. By heating, for example, 2,5-endomethylene $\Delta^3$ tetrahydrobenzyl alcohol and maleic anhydride in the presence of, say, linseed oil, dehydrated castor oil, ethylene glycol, dehydrated castor oil acids or dicyclopentadiene, modified products may be obtained. In the glycol modification, maleic anhydride, of course, is partially esterified with the glycol, while in the case of dehydrated castor oil acids modification a sufficient amount of the adduct must be employed to also esterify these acids.

Such modified esters, in turn, are compatible with most other alkyds, and with lacquers and varnishes. When the maleic ester of 2,5-endomethylene $\Delta^3$ tetrahydrobenzyl alcohol as such, or co-polymerized with different amounts of linseed oil or dehydrated castor oil, is mixed in various proportions (1:1, 1:3, 1:5, 1:10) with raw linseed oil, mineral oil, linseed oil plus mineral oil (50% solids), 36% oil modified alkyd, 29% oil modified alkyd, phenolic tung linseed oil varnish, plasticized lacquers containing 23% ½ second nitro cellulose and 7% 150 second nitrocellulose respectively, only the 1:10 mixtures with mineral oil develop cloudiness.

In preparing the condensation products between $\beta,\gamma$-unsaturated alcohols and conjugated dienes, the procedure of U. S. Patent 2,352,606 may be followed.

*Example I*

A mixture of butadiene (531 gr.) and allyl alcohol (2125 gr.) is heated in an autoclave at 200–225° C. for 8 hours. The reaction mixture is then subjected to fractional distillation to give 365 gr. (33% of the theoretical) of the butadiene-allyl alcohol condensation product (1,2,5,6-tetrahydrobenzyl alcohol), which is a colorless liquid boiling at 76° C./5 mm. Hg.

*Example II*

A mixture of isoprene (680 gr.) and allyl alcohol (2900 gr.) is heated in an autoclave at 230° C. for 6 hours. On distillation of the reaction mixture, 487 gm. (38.7% of the theoretical) of the adduct is obtained, which boils at 91° C./5 mm. Hg.

*Example III*

A mixture of methyl pentadiene (985 gr.), consisting of 85% 2-methyl-1,3-pentadiene and 15% 4-methyl-1,3-pentadiene, and allyl alcohol (3088 gr.) is heated in an autoclave at 250° C. for 8 hours. The reaction mixture is then subjected to fractional distillation whereby the excess allyl alcohol is recovered and the methyl pentadiene-allyl alcohol condensation product 494 gr. (29.4% of the theoretical) is collected as a colorless liquid boiling at 83° C./2 mm. Hg.

*Example IV*

A mixture of 99% grade dicyclopentadiene (330 gr.) and crotyl alcohol (720 gr.) is heated in an autoclave at 220–235° C. for 12 hours. The reaction mixture is then fractionated to recover the excess crotyl alcohol. 270 gr. (38.9% of the theoretical) condensation product is recovered as a liquid boiling at 81–86° C./1 mm. Hg.

Example V

A mixture of butadiene (648 gr.) and methallyl alcohol (2592 gr.) is heated in an autoclave at 230° C. for 24 hours. After fractionation of the reaction mixture, 212 gr. (14% of the theoretical) condensation product is obtained which boils at 68–74° C./2 mm. Hg.

Example VI

A mixture of maleic anhydride (1078 gr.) and 2,5-endomethylene Δ³ tetrahydrobenzyl alcohol, the allyl alcohol adduct of cyclopentadiene (3274 gr.), is heated and agitated under $CO_2$, at 180–190° C. for 8 hours. Water, liberated in the esterification is collected in a water trap which permits the return to the reaction mixture of any of the alcohol carried over by the water vapors. Excess alcohol is then removed by vacuum or steam distillation. There is obtained 572 gr. of distillate and 3500 gr. of a light yellow oil, having an acid number of 2.0 and a viscosity of 27 poises.

Example VII

A mixture of fumaric acid (1276 gr.) and the allyl alcohol adduct of cyclopentadiene (3274 gr.) is heated and agitated under $CO_2$, at 180–190° C. for 8 hours, whereby the alcohol, carried over into a water trap, is returned to the reaction mixture. Upon completion of the esterification, the excess thereof is removed by vacuum or steam distillation. There is obtained 540 gr. of distillate and 3580 gr. of a light yellow oil, having an acid number of 2.3 and a viscosity of 28 poises. However, on standing at room temperature, this oil solidifies almost completely due to the crystallization of the high melting, monomeric allyl alcohol-cyclopentadiene fumarate which is present in large amounts.

Example VIII

The oil, prepared according to Example VII, is bodied to a viscosity of 1000 poises, by heating it under $CO_2$ at 200° C. for approximately 3 hours. At this viscosity, the oil remains indefinitely fluid.

Example IX

A mixture of itaconic acid (143 gr.) and the allyl alcohol adduct of cyclopentadiene (323 gr.) is heated for 9 hours as described in Example VI and the excess of alcohol then removed in the disclosed manner. There is obtained 343 gr. of a viscous oil, having an acid number of 7.7. This resin is not stable, for it gels upon a few days standing at room temperature.

Example X

A mixture of maleic anhydride (110 gr.) and the allyl alcohol-butadiene adduct of Example I (302 gr.) is heated and agitated under $CO_2$, at 180–190° C. for 12 hours in a manner illustrated in Example VI. Upon completion of the esterification, the excess of butadiene adduct is removed from the mixture by vacuum distillation, at 200° C./5 mm. Hg. The esterification product is a light yellow oil of an acid number of 4.3 and a viscosity of 3.7 poises.

Example XI

A mixture of fumaric acid (130 gr.) and the allyl alcohol-butadiene adduct of Example I (302 gr.) is heated in the foregoing manner for 12 hours and the excess of allyl alcohol-butadiene adduct removed as disclosed in Example VI. The yield is 315 gr. of a light yellow oil of an acid number 4.7 and a viscosity of 5.5 poises. Upon standing at room temperature, monomeric fumaric acid ester of 1,2,5,6-tetra-hydrobenzyl alcohol crystallizes from the oil.

Example XII

A mixture of maleic anhydride (171 gr.) and the allyl alcohol-isoprene adduct of Example II (529 gr.) is heated for 15 hours and the excess of the allyl alcohol-isoprene adduct removed as disclosed in Example VI. The yield is 545 gr. of a light yellow oil, having an acid number of 6.0 and a viscosity of 8.8 poises.

Example XIII

A mixture of fumaric acid (203 gr.) and the allyl alcohol-isoprene adduct of Example II (529 gr.) is heated and agitated for 18 hours and the excess of isoprene adduct removed as disclosed in Example VI. 540 gr. of a yellow oil is obtained, of an acid number 8.7 and a viscosity of 600 poises.

Example XIV

A mixture of maleic anhydride (123 gr.) and the allyl alcohol-methyl pentadiene condensate of Example III (420 gr.) is heated and agitated under $CO_2$, at 180–190° C. for 10 hours. The alcohol carried out of the mixture by the liberated water of esterification is returned to the reaction mixture by means of a suitable trap. On completion of the esterification, the excess alcohol is removed from the mixture by vacuum distillation. The product (430 gr.) is a light yellow oil of an acid number of 7.1 and a viscosity of 15 poises.

Example XV

A mixture of fumaric acid (145 gr.) and the allyl alcohol-methyl pentadiene condensate of Example III (420 gr.) is heated for 12 hours and the esterification product recovered in the manner of Example XIV. A light yellow oil is obtained (420 gr.) of an acid number of 8.1 and a viscosity of 54 poises.

Example XVI

A mixture of maleic anhydride (98 gr.) and the crotyl alcohol-cyclopentadiene condensate of Example IV (331 gr.) is heated for 6 hours and the esterification product recovered as disclosed in Example XIV. There is obtained 327 gr. of a light yellow oil, having an acid number of 5.3 and a viscosity of 25 poises.

Example XVII

A mixture of fumaric acid (116 gr.) and the crotyl alcohol-cyclopentadiene condensate of Example IV (331 gr.) is heated for 8 hours and the esterification product recovered as disclosed in Example XIV. The product is a light yellow oil (325 gr.) of an acid number of 5.0 and a viscosity of 35 poises.

Example XVIII

A mixture of maleic anhydride (64 gr.) and the methallyl alcohol-butadiene condensate of Example V (198 gr.) is heated and agitated under $CO_2$, at 230° C. for 30 hours. Excess alcohol is returned to the reaction mixture in a suitable manner and, at the end of the heating period, removed by vacuum distillation, leaving 175 gr. of a semi-solid product of an acid number of 27.6.

Example XIX

A mixture of fumaric acid (75 gr.) and the methallyl alcohol-butadiene condensate of Example V is heated and the esterification product recovered in the manner disclosed in Example XVIII. The resulting product consists of 185 gr. of a semi-solid substance having an acid number of 25.4.

The products of Example XVIII and XIX cure to hard, brittle films in 20-30 minutes at 163° C.

They were found compatible with, for instance, a copolymer of vinyl chloride and vinyl acetate containing about 85-88% vinyl chloride and having a molecular weight of about 10,000.

The following two examples illustrate the esterification to non-curable resins of a $\beta,\gamma$-unsaturated alcohol-conjugated diene adduct with a saturated dicarboxylic acid, which, however, may be advantageously co-esterified and/or copolymerized with the herein claimed thermosetting resins.

Example XX

A mixture of sebacic acid (1616 gr.) and the allyl alcohol adduct of cyclopentadiene (2384 gr.) is heated and agitated under $CO_2$, at 180-190° C. for 15 hours. The alcohol carried out of the mixture by the liberated water of esterification is returned to the reaction mixture. Upon completion of the esterification, the excess thereof is removed by vacuum distillation. The sebacic acid ester obtained (3295 gr.) has an acid number of 6.4 and a viscosity of 1.5 poises.

Example XXI

A mixture of azelaic acid (1692 gr.) and the allyl alcohol adduct of cyclopentadiene (2682 gr.) is heated and the excess alcohol removed in the manner disclosed in Example XXI. There is obtained 3445 gr. of a yellow oil having an acid number of 4.6 and a viscosity of 1.25 poises.

The following examples illustrate the preparation of various co-esterification products comprising the new thermosetting resins.

Example XXII

A mixture of fumaric acid (522 gr.), sebacic acid (203 gr.), and the allyl alcohol adduct of cyclopentadiene (1647 gr.) is heated and agitated under $CO_2$ at 180-190° C. for 10 hours. The alcohol adduct, carried out of the mixture by the water of esterification is returned to the reaction mixture. On completion of the esterification the excess alcohol is removed by vacuum distillation. There is obtained 1825 gr. of a light yellow oil of an acid number of 1.0 and a viscosity of 95 poises.

Example XXIII

A mixture of maleic anhydride (98 gr.), dehydrated castor oil acids (40 gr.), and the allyl alcohol adduct of cyclopentadiene (350 gr.) is esterified in the manner of the foregoing example at 180° C. for 4 hours and then at 230° C. for 2 hours. The removal of excess alcohol adduct by vacuum distillation leaves 375 gr. of a product having an acid number of 5 and a viscosity of 30 poises.

Example XXIV

A mixture of maleic anhydride (882 gr.), the allyl alcohol adduct of cyclopentadiene (2925 gr.), and linseed oil (900 gr.) is heated and agitated under $CO_2$ at 185-190° C. for 13 hours. After removal of excess alcohol by vacuum distillation at 210° C./5 mm. Hg, 670 gr. of a product is obtained having an acid number of 5.6 and a viscosity of 10.7 poises.

Example XXV

A mixture of maleic anhydride (882 gr.), the allyl alcohol adduct of cyclopentadiene (3125 gr.), and dehydrated castor oil (900 gr.) is heated and agitated under $CO_2$ at 185-190° C. for 15 hours. After removal of excess alcohol as in Example XXIV, 590 gr. of the distillate is recovered and 3950 gr. of a product having an acid number of 8.5 and a viscosity of 46.3 poises.

Example XXVI

A mixture of maleic anhydride (1274 gr.), the allyl alcohol adduct of cyclopentadiene (2418 gr.), and diethylene glycol (351 gr.) is heated and agitated under $CO_2$ at 185-190° C. for 7 hours. After another addition of alcohol (500 gr.) the heating is continued for 7 more hours. The removal of excess alcohol results in 550 gr. distillate and 3740 gr. of a product of an acid number of 8.1 and a viscosity of about 1300 poises.

Example XXVII

A mixture of fumaric acid (1044 gr.), allyl alcohol-cyclopentadiene condensate (2700 gr.) and dehydrated castor oil (820 gr.) is heated and agitated under $CO_2$ at 180-190° C. for 10 hours. The separation of excess allyl alcohol-cyclopentadiene by vacuum stripping yields 3766 gr. of light yellow oil of an acid number of 5.6 and a viscosity of 200 poises.

Example XXVIII

A mixture of WG grade rosin (302 gr.) and allyl alcohol-cyclopentadiene condensate (200 gr.) is agitated and heated under reflux whereby the liberated water is allowed to escape from the reaction mixture. The initial temperature of 200° C. rises to 260° C. in the course of 20 hours heating. Vacuum distillation leaves a straw colored solid of a melting point of 84-93° C. and an acid number of 22.5.

Example XXIX

A mixture of rosin (300 gr.), maleic anhydride (98 gr.), and allyl alcohol-cyclopentadiene condensate (450 gr.) is heated, under reflux at 200-230° C. for 36 hours. Excess cyclo-alcohol is removed by vacuum distillation, leaving a light yellow solid, having an acid number of 13 and a melting point of 85-90° C.

Example XXX

A mixture of ester gum (155 gr.), maleic anhydride (50 gr.), and allyl alcohol-cyclopentadiene condensate (165 gr.) is heated, with stirring under $CO_2$, first for 3 hours at 180° C., and then for 2 hours at 230° C. Excess alcohol is removed from the mixture by vacuum distillation, leaving 320 gr. of a product which has an acid number of 16, melts at 50-60° C. and is only slightly darker than the original ester gum.

I claim:

1. The method of preparing new thermosetting products which comprises heating and agitating, in an inert atmosphere, an $\alpha,\beta$-unsaturated dicarboxylic acid with an excess of the cyclic adduct of a conjugated diene and a $\beta,\gamma$-unsaturated alcohol, and removing the excess of the said adduct.

2. The method according to claim 1 in which the conjugated diene component of the adduct is isoprene.

3. The method according to claim 2 in which the a,β-unsaturated acid is maleic acid anhydride.

4. The method according to claim 3 in which the unsaturated alcohol compound of the adduct is allyl alcohol.

5. The method according to claim 1 in which the conjugated diene component of the adduct is butadiene.

6. The method according to claim 5 in which the a,β-unsaturated dicarboxylic acid is fumaric acid.

7. The method according to claim 6 in which the unsaturated alcohol component of the adduct is methallyl alcohol.

8. The method according to claim 1 in which the conjugated diene component of the adduct is cyclopentadiene.

9. The method according to claim 8 in which the a,β-unsaturated dicarboxylic acid is maleic acid anhydride and the β,γ-unsaturated alcohol component of the adduct is allyl alcohol.

10. The method according to claim 9 in which the excess of the adduct is not less than 10 per cent and the period of heating is 8 to 10 hours at 180–190° C.

11. A thermosetting product consisting of the polymerized ester of an a,β-unsaturated dicarboxylic acid with the cyclic adduct of a conjugated diene and a β,γ-unsaturated alcohol.

12. A thermosetting product according to claim 11 in which the a,β-unsaturated dicarboxylic acid is maleic acid anhydride and the cyclic adduct is a cyclopentadiene allyl alcohol condensate.

JOSEPH NICHOLS.

REFERENCES CITED

The following references are of record in the file of this patent:

UNITED STATES PATENTS

| Number | Name | Date |
|---|---|---|
| 2,352,606 | Alder et al. | July 4, 1944 |
| 2,384,595 | Blair | Sept. 11, 1945 |
| 2,415,453 | Thomas | Feb. 11, 1947 |
| 2,445,627 | Morris et al. | July 20, 1948 |